No. 745,395. PATENTED DEC. 1, 1903.
W. G. SMITH.
PLANT PROTECTOR.
APPLICATION FILED FEB. 7, 1903.
NO MODEL. 2 SHEETS—SHEET 1.
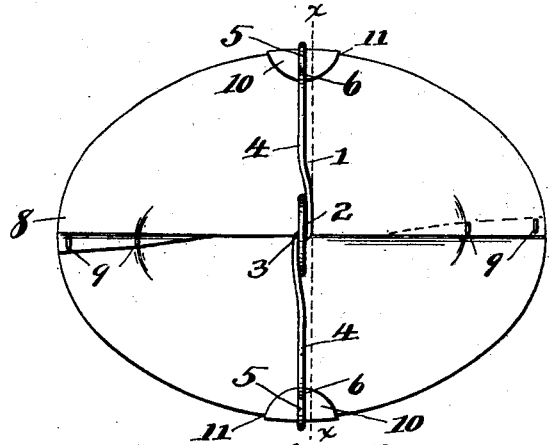
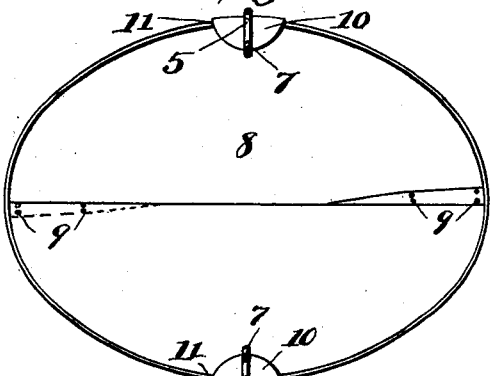
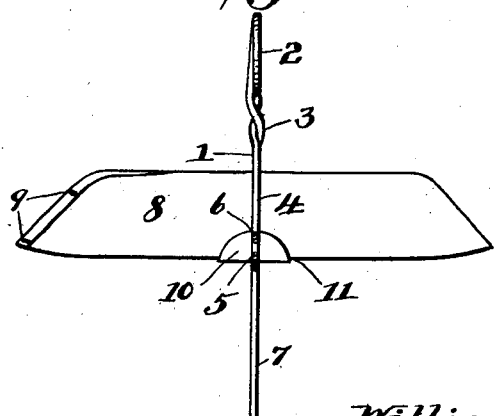
WITNESSES:
Jos H Blackwood
E Hart
INVENTOR
William Gee Smith
BY
Attorney No. 745,395. PATENTED DEC. 1, 1903.
W. G. SMITH.
PLANT PROTECTOR.
APPLICATION FILED FEB. 7, 1903.
NO MODEL. 2 SHEETS—SHEET 2.
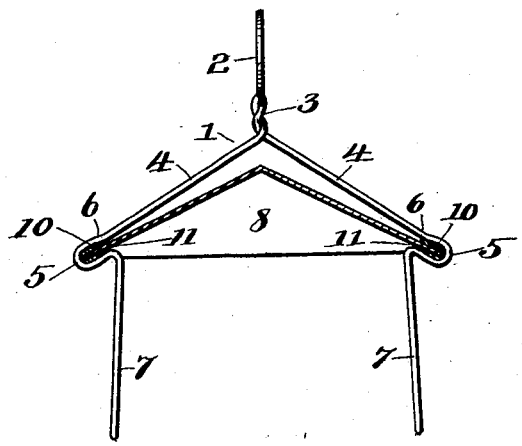
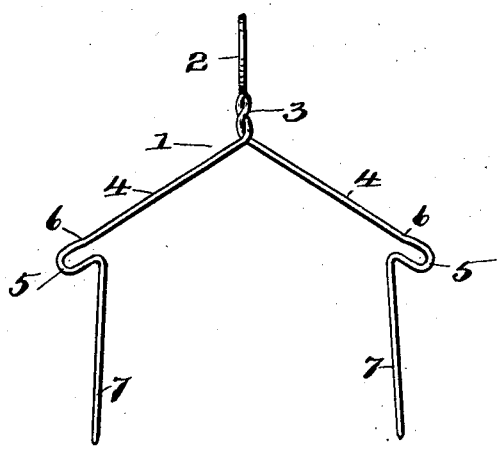
WITNESSES:
Jas. H. Blackwood
E. Hart
INVENTOR
William Gee Smith
BY
Attorney No. 745,395. Patented December 1, 1903.

UNITED STATES PATENT OFFICE.

WILLIAM GEE SMITH, OF CINCLARE, LOUISIANA.

PLANT-PROTECTOR.

SPECIFICATION forming part of Letters Patent No. 745,395, dated December 1, 1903.

Application filed February 7, 1903. Serial No. 142,258. (No model.)

*To all whom it may concern:*

Be it known that I, WILLIAM GEE SMITH, a citizen of the United States, residing at Cinclare, in the parish of West Baton Rouge, State of Louisiana, have invented certain new and useful Improvements in Plant-Protectors; and I do declare the following to be a full, clear, and exact description of the invention, such as will enable others skilled in the art to which it pertains to make and use the same.

My invention relates to an improvement in protectors for plants, seeds, bulbs, &c., and has for its object to provide a device to be used for protecting young plants, seeds, bulbs, &c., from rain, heat, frost, wind, and sun, and which is very simple and inexpensive and durable in construction and cannot be easily displaced by wind, rain, &c.

The invention consists in the construction, combination, and arrangement of the various parts, as hereinafter more fully described and claimed.

In the drawings which illustrate my invention, Figure 1 is a top plan view; Fig. 2, a bottom plan view; Fig. 3, a side view in elevation; Fig. 4, a cross-section on line X X of Fig. 1; Fig. 5, a side elevation of the frame in which the hood or cover of the protector is held; Fig. 6, a detail of one of the guard-plates.

Referring to the drawings, in which like numerals of reference denote like parts throughout the several views, 1 represents the frame of the protector, which is made of wire; but it may be made of other suitable material and comprises a ring 2 at the top, which serves as a handle, a twisted portion or stem 3 below said ring, two downwardly-slanting arms 4, extending from said twisted portion, each provided with a spring-clamping loop 5 at a point 6 and each terminating in a vertical outwardly-slanting prong 7.

8 is the hood or cover of the protector, the opposite side edges of which are inserted in the clamping-loops. Although said hood is preferably made oblong in shape, it can be made of any other shape desired, and although constructed, preferably, of wood, which is painted, tarred, or otherwise treated to preserve it from decay, it may be made of waterproof paper, metal, or any other suitable material.

9 represents staples by which the ends of the hood are secured. 10 denotes guard tips or plates, made of tin or other material, attached to the edge of the hood 8 at points 11 for the purpose of protecting it from wear when it is clamped by the spring-clamping loops of the frame at those points.

The protector will be in practice about twelve inches long, ten inches wide, and five inches deep; but I do not limit myself to these proportions, as the protector may be of any suitable size to adapt it for the special kind of plant to be protected.

In use the protector is grasped by the handle and placed over the plant, the prongs bent inward until they have assumed a substantially vertical position, and as they are forced downwardly into the ground they will take an outwardly-slanting direction, which will greatly assist in holding them securely in the ground, and thereby keep the protector in place.

I do not wish to be limited to the precise details of construction as herein shown and described, as the same may be changed somewhat without departing from the spirit of my invention.

What I claim is—

1. A plant-protector having a hood or cover, and a frame provided with loops in which said hood is held, substantially as described.

2. A plant-protector provided with a frame having a handle at the upper portion, outwardly-slanting prongs at the lower portion, and spring-clamping loops intermediate said upper and lower portions, and a hood or cover held in said loops, substantially as described.

3. A plant-protector having a hood or cover, a frame provided with resilient clamping-loops in which said hood is held, and prongs, substantially as described.

4. A plant-protector having a hood or cover, a frame provided with a handle, downwardly-slanting arms having loops in which said hood is held, and prongs, substantially as described.

5. A plant-protector having a hood or cover, a frame provided with a handle, a twisted portion below said handle, downwardly-extending arms below said twisted portion having loops in which said hood is held, and outwardly-slanting prongs below said loops, substantially as described.

6. A plant-protector having a hood or cover, with guard-plates on its edge, a frame provided with loops which engage said guard-plates, and in which said hood is held, and prongs, substantially as described.

7. A plant-protector having a hood or cover, with guard-plates on its edge, and a frame provided with spring-clamping loops which engage said guard-plates and thereby hold said hood in place, substantially as described.

In testimony whereof I affix my signature in the presence of two witnesses.

WILLIAM GEE SMITH.

Witnesses:
A. W. WALLACE,
J. M. DAIGLE.